United States Patent [19]

Farkas et al.

[11] Patent Number: 5,003,408
[45] Date of Patent: Mar. 26, 1991

[54] METHOD AND APPARATUS FOR REMOVING DATA STREAM VARIATIONS

[75] Inventors: Richard A. Farkas, Birmingham; Marlin K. Klumpp, Tecumseh; Michael L. Bolt, Ann Arbor; Housan Dakroub, Dearborn Heights, all of Mich.

[73] Assignee: Irwin Magnetic Systems, Inc., Ann Arbor, Mich.

[21] Appl. No.: 228,318

[22] Filed: Aug. 4, 1988

[51] Int. Cl.$^5$ ................................................ G11B 5/09
[52] U.S. Cl. .......................................... 360/51; 360/43
[58] Field of Search ............................. 360/51, 44, 43; 375/118-120, 94, 81

[56] References Cited

U.S. PATENT DOCUMENTS 3,810,234  5/1974  Monert ................................. 360/51

Primary Examiner—Vincent P. Canney
Attorney, Agent, or Firm—Price, Heneveld, Cooper, DeWitt & Litton

[57] ABSTRACT

The specification discloses means for correcting timing variations present in a data stream emanating from a data storage device such as a magnetic tape drive or the like before the data stream is applied to the data separator or other such input device of a computer. This is accomplished by remodulating the time-varying bits in the data stream in a manner which reduces or eliminates the undesired timing variations. Basically, the system utilizes frequency-modulation techniques to in effect remodulate the raw data stream. The application discloses, as one preferred embodiment, a pulse-width modulator which receives the error signal output of a phase-locked loop network, the input of the pulse-width modulator being coupled to the incoming raw data stream. The primary output of the phase-locked loop circuit is coupled to the input of the pulse-width modulator, and the output of the pulse-width modulator is coupled to the input of a pulse generator so as to produce output pulses of substantially uniform width which occur in synchronism with output pulses of the pulse-width modulator and thus constitute in effect a remodulated version of the raw data stream, in which the undesired timing variations have been removed or reduced by an acceptable level.

35 Claims, 4 Drawing Sheets

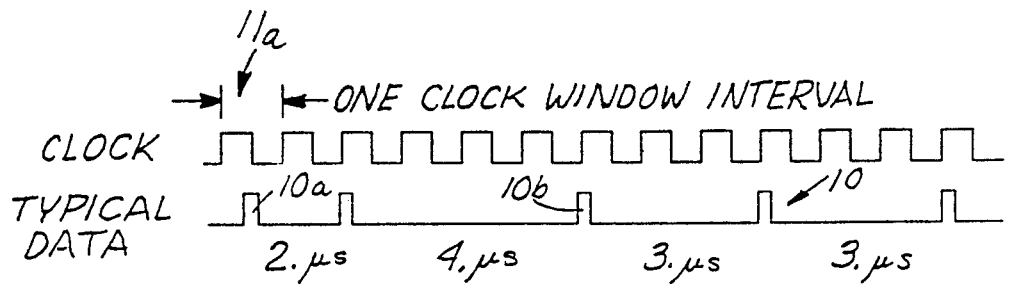
Fig.1.
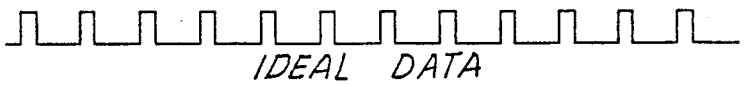
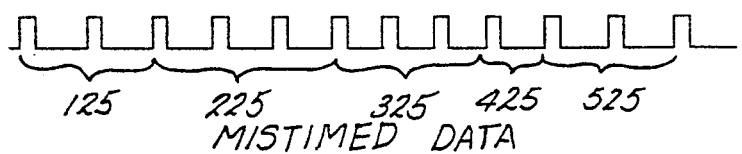
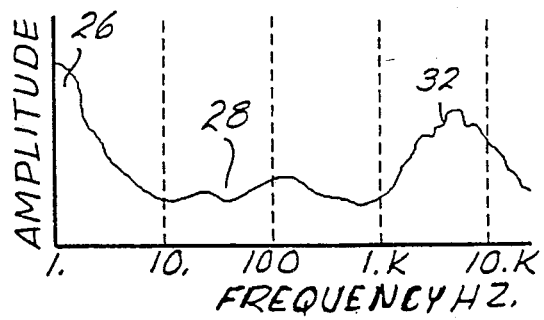
Fig. 3.
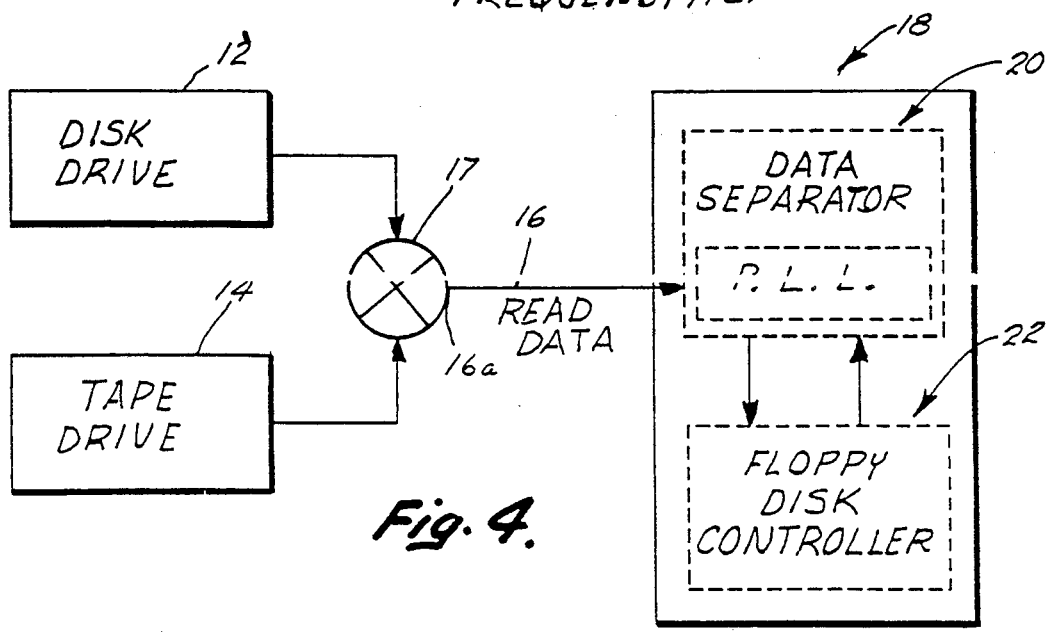
Fig. 4.

METHOD AND APPARATUS FOR REMOVING DATA STREAM VARIATIONS

BACKGROUND OF THE INVENTION

This invention relates in a general sense to methods and apparatus used in the handling, i.e. transmittal, processing, and utilization, of streaming digital data, such as are present for example in data storage and retrieval carried on as an adjunct to computer operations generally, as well as in communications and numerous other such activities. In a more particular sense, the invention pertains to novel methods and apparatus for in effect reformulating such digital data streams for the purpose of removing irregularities and variations which occur both randomly and otherwise in the timing and sequence of the bits (recorded bursts) of which such digital data is comprised, to thereby eliminate a substantial and potentially unacceptable source of processing error.

While the invention has broad aspects and applications, the nature of the problem apprehended and resolved, as well as the solutions provided, may be illustrated by reference to a particular example, involving random and varying degrees of data-burst timing change or displacement, which is becoming increasingly prevalent as bit density increases in data-processing and storage applications, a condition seemingly occurring on a continuous basis in the progress of the technology generally. Thus, while in a broader sense the invention provides technique for removing extraneous information from digital data streams generally, a particular example of the underlying problem is found in those numerous computer applications in which digital data is routed to and from the computer by use of peripheral storage devices such as a "floppy disk" drive and/or a tape drive, in particular streaming tape drives which use magnetic tape in cartridge form, which are essentially interchangeable with the floppy disk drive, fitting into the same standard-sized physical space and utilizing a standard floppy disk drive controller.

In a system such as that just noted, the "read data" stream is outputted to a data separator contained within the computer, although a data separator may also be built into the tape drive itself. In either event, the read data stream communicated between the tape drive and the computer is subject to the characteristics of the computer data separator as well as the characteristics of the tape drive and the tape cartridge. One aspect of this situation is the fact that practically all tape-handling apparatus, e.g. tape drives and tape cartridges, directly affect the data stream written onto and read from the tape itself, as a result of numerous mechanical and magnetic characteristics of both the drive and the cartridge, tape-handling being a physical process involving motion and contact with moving recording tape.

Thus, while the digital data stream initially provided from the computer may have substantially no significant deviations or other such errors in the timing of the data bursts, the tape drive and/or tape cartridge is very likely to produce timing changes in the sequence of data bits, particularly when the data is "interchanged", i.e. recorded on a tape cartridge by use of a first drive and then subsequently reproduced from that cartridge by use of a different tape drive. At the same time, practically all tape cartridges are known to exhibit speed variation characteristics when the tape is transported from one end to the other, and back and forth. Moreover, such speed variations may occur somewhat randomly as a result of such things as longitudinal flexure of the recording tape and of the drive belts used within the tape cartridges, particularly in what is perhaps the most prevalent such cartridge in current use, which utilizes drive belts having a significant amount of elasticity.

As a result of these effects, together with physical contact within the cartridge between the tape and various tape guides, etc., tape speed variation occurs randomly and in varying magnitudes, including "instantaneous" speed variation, known as "ISV". Such tape speed variations (in particular, ISV) have an understandable effect on the timing of data "written" on and "read" from the tape, acceleration resulting in the effective decrease of both the spacing between recorded bits and the duration or width of the recorded bits themselves, while decelerative speed effects cause increases in such spacing and duration. The net result appears as a frequency modulation of the resulting data stream, of a randomly-occurring nature and varying extent, but which is likely to have certain basic characteristics for a given tape cartridge caused by the particular physical aspects of that cartridge.

Depending upon a variety of factors, including the data separator utilized in a given computer application, the aforementioned modulation of the digital data stream may well have such an extreme effect on the timing of the bits in the data stream as to place their occurrence outside the allowable "window" (i.e. time slot) during which the presence or absence of the data bit has logical significance, thereby resulting in extensive bit rate error. Particularly where, as frequently occurs, the tape drive is utilized in conjunction with a floppy disk drive, and especially where it actually utilizes a floppy disk controller, the data separator in the computer may well have been optimized for the conditions characteristic of the floppy disk drive, since that is more likely to be the basic operating drive which is present in all applications (the tape drive being primarily for archival or "back-up" purposes). However, disk drives, in particular floppy disk drives, have much different characteristics than tape drives and are subject to much different and substantially less ISV characteristics. Therefore, in a given application, the computer data separator may not be able to consistently track the digital data stream from the tape drive, at least where the tape cartridge used is one having characteristically high, or substantial, amounts of ISV, which produce substantial frequency modulation effects in a resulting digital data stream.

As indicated above, the particular example described is merely that of a characteristic and recognizable situation actually present in state-of-the-art, commercially-available equipment in which data stream timing irregularities are caused by the tape cartridge; in fact, however, such data stream irregularities may result from a number of causes and be present in a number of circumstances, in data communication as well as in data storage and retrieval. Consequently, the novel solutions provided by the invention should be understood in this broader sense, even though illustrated for clarity and convenience by reference to a particular situation involving tape drives and tape cartridges.

BRIEF SUMMARY OF THE INVENTION

In accordance with the present invention, unique and desirable methods and apparatus are provided for, in effect, absorbing and removing extraneous variations in a digital data stream.

More particularly, the invention is based on the recognition that such extraneous variations or timing defects in the data stream produced by certain popular and widely-prevalent tape drives and tape cartridges is actually a data stream frequency-modulation problem, which may be resolved through what may be considered reverse-modulation or compensation, contrary to the opinion most frequently encountered, where the underlying problem is considered at all, that the problem is simply one of timing which may be dealt with by merely employing data-synchronizing, data-locking techniques, i.e. through the use of phase-locked loops and the like.

Accordingly, in a broad aspect of the invention, the solution provided for the problem apprehended comprises reformatting the data stream through reverse-modulation techniques, thereby in effect actually removing the undesired data variations which constitute the extraneous variations or timing defects in the data stream.

In a more particular sense, an example of the approach considered most preferable for implementing the invention comprises use of a pulse-width modulator which operates on the bits in the data stream under control of an error signal produced through a phase-locked loop, and in a more particular application, the pulse-width modulator uses as an input the control voltage output of such phase-locked loop rather than the actual read data stream.

The foregoing generalized description of the invention may be better apprehended and understood by reference to the ensuing description of preferred embodiments, and by consideration of the appended drawings setting forth one or more particularized examples of the concepts underlying the invention.

BRIEF DESCRIPTION OF THE DRAWINGS

In the appended drawings:

FIG. 1 is an enlarged graphical representation in the nature of a timing diagram, showing the general nature of digital data pulses in a stream, such as that to which the invention is directed, together with related clock pulses;

FIG. 2 is a graphical representation showing (in FIG. 2b) in general the appearance of variations in a data stream occurring during operation, in juxtaposition with (FIG. 2a) an idealized such data stream;

FIG. 3 is a graphical representation of an exemplary frequency spectrum which is typical of the modulation embodied in the read data stream provided by the control voltage output of a phase-locked loop tracking data stream tape cartridges of the type referred to herein;

FIG. 4 is a block diagram illustrating a typical computer system employing both a floppy disk drive and back-up tape drive;

DESCRIPTION OF THE PREFERRED EMBODIMENTS

Figure 5:
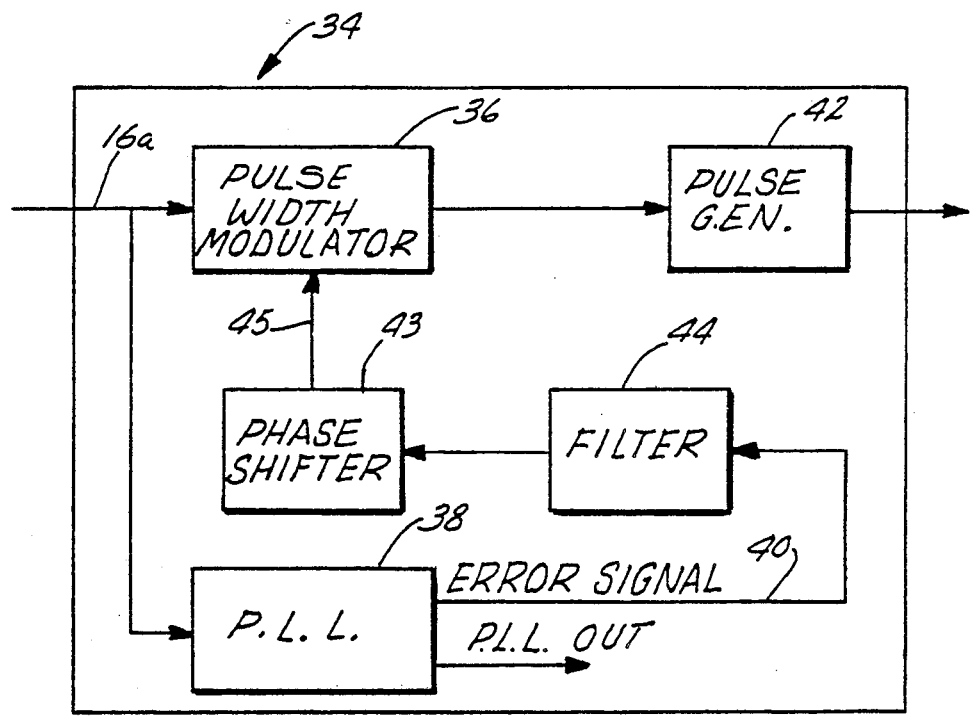
FIG. 5 is a basic system block diagram broadly illustrating a generalized implementation of the invention.

The pulse train 10 shown in FIG. 1 is generally illustrative of the typical form of data outputted by either the floppy drive 12 or tape drive 14 shown in the block diagram of FIG. 4, which is routed to and from the computer 18 as a function of a multiplexer 17. As will be understood, the individual pulses (designated 10a and 10b) in pulse train 10 are usually in the form of MFM sequences, and will typically have a pulse width of 200 nanoseconds separated by a spacing of two, three or four microseconds, depending upon the particular data being transferred, the real information content actually being determined by the space between the pulses rather than by the duration of the pulses themselves (i.e., the presence or absence of pulses at particular points in time). As shown in FIG. 1, the data pulses 10 should occur during clock cycles 11 which establish time detection windows, a clock cycle 11 being wider than the data pulses.

As outputted by the peripheral storage devices (disk drive and tape drive) 12 and 14, the pulse train 10 is provided to the computer 16 with no extraneous or supplemental clock information, etc. Clocking information is in effect buried in the pulse train itself, i.e. the data separator in the computer 18 generates clock information from the pulse train coming in. Thus, as indicated by the enlarged and augmented component block portrayed in FIG. 4, the computer 18 includes a data separator 20 which, basically, comprises an interconnected phase-locked loop ("PLL"), a voltage-controlled oscillator ("VCO") and a loop filter ("LF"), the phase-locked loop of which generates a clock train such as that shown in FIG. 1, which is synchronized with the data pulses 10. Such a clock signal is then used by the data-separator logic to put out signals for the floppy disk controller 22, which is also part of the computer. Thus, the data separator 20 provides signals to the floppy disk controller 22, i.e. a clock signal such as pulse train 11 and the data pulse train, and the data separator 20 synchronizes the clock to the data signal. In FIG. 1, the individual data pulses 10a and 10b are shown in their idealized location, i.e. midway during the occurrence of the clock cycles 11a and 11b, which are typically much wider, as shown. Thus, there is an appreciable "window", i.e. allowable time span, during which the data pulses may occur in relation to the clock pulses and be acceptable for logical processing and proper system operation.

As indicated above, however, tape speed variations, in particular ISV, can and do occur at various points during tape transport. Where such tape speed variations are gradual, the phase-locked loop in the data separator 20 may well be able to track them, in effect producing time-varying clock signals which occur more rapidly (closer together) if the tape speeds up and more slowly (further apart) if the tape slows down; however, when rapid (i.e. "instantaneous") tape speed variations occur ("ISV"), this situation is likely to change to the extent that tracking by the phase-locked loop in the computer data separator is no longer adequate, and the result is that data-tracking errors occur. With substantial ISV present, the extent of such errors very soon becomes unacceptable. In point of fact, the data separator 20 within the computer 18 may well have its own circuit instabilities, and these may well exacerbate the situation, particularly if they occur at or close to critical points in the ISV characteristics of a given tape cartridge or drive.

As indicated above, the effects of ISV in tape cartridges results in wide and randomly-occurring variations in the occurrence, (i.e. timing) of the data pulses, an illustrative example of which is shown in FIG. 2b (bottom line) in which it will be noted that commencing from the left, the data pulses 125 are crowded and of short duration, the data pulses 225 nearer the center are more normal in character, the data pulses 325 are stretched and wide, far apart, and the data pulses 425 and 525 progressively become more normal, analogous to pulses 225. On the other hand, the desired and normally-expected data pulse train is as illustrated on the upper line in FIG. 2a, wherein the pulses are regular and evenly-distributed. As may be appreciated, however, the occurrence of a pulse train such as that shown on the bottom line in FIG. 2 instead of the normally-expected pulse train is a most troublesome situation, particularly since substantial jitter is typically present and the cause of the disruptions are not at all self-evident. Indeed, the consideration of such variations as constituting, in effect, a frequency-modulation of the normally-expected data pulse train is in and of itself believed to be a realization of novel character, and the understanding that such variations, or modulations, are the result of ISV in the tape transport/tape cartridge is believed to be even further from general knowledge or understanding. Thus, while the basic solutions provided in accordance herewith are believed novel and highly advantageous when applied to any such variation in a digital pulse train, the particular problem apprehended and solved is believed to be even further novel and significant.

The spectral plot shown in FIG. 3 is believed useful in explaining the nature of the particular ISV problem in tape cartridges referred to above. More particularly, this plot (which although somewhat pictorially and generalized in nature is nonetheless reasonably representative of actual conditions, as revealed by use of a spectral analyzer) shows the approximate spectral content of the variations (e.g. modulation effects) in the "data" output provided by a particular state-of-the-art tape cartridge which is in extensive use for data-storage purposes as of the present point in time, as represented by the control voltage output from a phase-locked loop tracking such data output. As illustrated, this spectral plot shows, at a point 26, a comparatively high level of very low-frequency content (at about one or two Hz), which rapidly decreases to a broad area of much lower and gently undulating levels 28 extending from about 10 Hz to 1 kHz, apart from which there is a notable response variation constituting a notable increase in amplitude over an area 32 located in the spectral area commencing at about 8 kHz and extending to well beyond 10 kHz. It is this sizeable anomaly 32 which in essence characterizes the effect attributable to cartridge-produced ISV, and which will unless otherwise dealt-with result in the substantial timing variations (in effect, frequency modulation) of the read data pulses described above.

The realization that the error introduced into the read data train by the effect of tape transport characteristics of the cartridge is in the nature of anomalous data pulse frequency variations is certainly not one which is widely appreciated, and the same is true with respect to appropriate measures for counteracting such errors. Thus, conventional approaches for correcting data stream errors include the use of filtering techniques (e.g. band-reject or "notch" filters) or the use of additional phase-locked loop techniques. However, the implementation of such filters alone will not remedy the problem described above, since the disturbing frequencies are in the nature of a frequency modulation, and the outright removal of corresponding frequencies from the data train will do nothing to change the problems existing in the data stream, appearing at a much different point in the spectrum (and, in effect, varying in frequency from the nominal value by on the order of seven to eight kHz in the example under consideration). Similarly, phase-locking onto the shifted data train alone will not remove the disturbing frequencies and does not solve the basic problem since the phase-locked loop adjusts the clock to the data stream and does not substantially affect the timing of the data stream.

Although the conventional measures noted above do not solve the underlying problem, remodulation of the affected data in the stream will do so by, in effect, removing the disturbance. Thus, in simplified form, an approach such as that illustrated in FIG. 5 will potentially remedy the situation by actually eliminating the timing disturbances from the resulting data. As illustrated in this figure, the read data train on conductor 16a is provided to a modulator 36 and also to a phase-locked loop 38 whose error signal output is coupled to a tuned filter 44 whose bandwidth is centered upon that of the disturbing effect. The pass band of filter 44 is then coupled to a phase-shifter 43, which in effect adjusts the phase of the control voltage within the error-producing band. The resulting signal is then applied to the modulator 36 in the form of an oppositely-phased analog (inverse representation) of the erroneous frequency modulation, thereby causing the incoming pulse train to be inversely remodulated accordingly and, accordingly, eliminating the disturbance from the resulting remodulated output on line 16. In effect, the system 34 shown in FIG. 5 illustrates a form of implementation of the underlying system, which in that form is primarily analog in nature.

As indicated previously, the present invention provides for correction of such data stream anomalies by in effect removing them through procedures in the nature of inverse remodulation. FIG. 5 illustrates the general nature of a system 34 as envisioned by the present invention, which should be understood as intended for utilization between the tape drive 14 and the computer 18, in the read data line 16, although not necessarily used in conjunction with the read data from the disk drive 12. Thus, the initial portion 16a of the read data line 16 may be considered to be coupled, in this example, to both a pulse-width modulator 36 and a phase-locked loop 38, such that whereas the leading edge of the successive pulses in the read data train triggers the pulse-width modulator 36 to an "on" condition, the errorsignal output connection 40 from phase-locked loop 38 is used as a control voltage to the pulse-width modulator 36.

Accordingly, the output from the pulse-width modulator 36 (generally illustrated in FIG. 8b) will comprise a series of pulses analogous to those constituting the read data train from the tape drive 14, but of varying duration, being either shortened or extended as a function of the time difference (i.e. modulation effect) between the ideal or desired frequency of occurrence and that actually encountered, such time difference consisting of the spurious or other erroneous information content modulated onto the desired data pulse train (attributable, in the particular example described in this disclosure, to ISV effects). By coupling the output from pulse-width modulator 36 to a desired trigger network (e.g. a one-shot multivibrator) 42, and using the trailing edge of the modulated pulse output from pulse-width modulator 36 to trigger network 42, it will be seen that the resulting output (FIG. 8c) will comprise an inversely remodulated or reformulated series of pulses which, while based upon the original read data train appearing on conductor 16a, nonetheless occurs at a regular and consistent spacing analogous to the pulses 25 illustrated in FIG. 2b.

In conjunction with the system 34 currently under discussion, and as commented upon more fully hereinafter, a very desirable additional component is a band-pass filter 44 which is in the control-voltage line 46 extending from the error-signal output terminal 40 of phase-locked loop 38 to the control input (modulation input) 45 of pulse-width modulator 36. The pass band upon which this filter component (44) is centered should constitute the bandwidth of the disruption or disturbance whose effects are to be avoided, e g. the anomaly 32 depicted in FIG. 3 attributable to the particular ISV produced by the tape cartridge noted previously. A further and important aspect of the system 34 is that it provides a 90° phase shift in the signal provided to the pulse-width modulator 36 as a control input (shown symbolically as being provided by a separate "phase shifter" 43). The need for this is explained by the fact that there is a 90° phase shift error in the signal from the phase-locked loop 36 (the signal actually being an analog which is proportioned to tape velocity, and the velocity effects causing the error being, in reality, a differential of position with respect to time, and this is accomplished by the filter 44 and phase-shifter 43 (which may in fact comprise a single unit). It is desirable that this phase shift error be compensated for, preferably in a manner such that the resulting feedback to the pulse-width modulator 36 is a direct analog to the actual time-based error present in the read data train inputted on lead 16a. Thus, as a result of the further delay resulting from triggering of the pulse generator (one-shot) 42 on the trailing edge of the modulated pulse train, the resulting corrected or compensated wave provided on output 16 is directly in phase with the input wave, notwithstanding the fact that it has been displaced in time.

Figure 6:
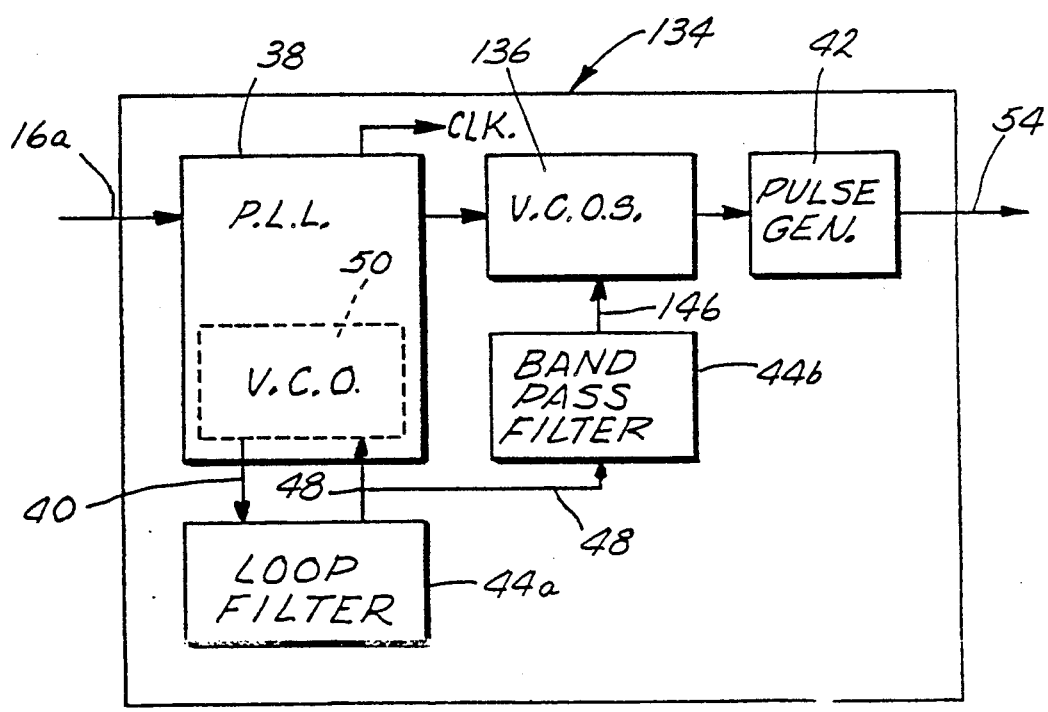
FIG. 6 is a more detailed system block diagram showing a first particular embodiment of the invention.

FIG. 6 illustrates a more particular embodiment of the basic system of FIG. 5, and also depicts certain variations and further attributes of the invention. Like system 34, the system 134 shown in FIG. 6 utilizes the read data pulse train occurring on conductor 16a and couples the same to a phase-locked loop component 38; in this version, however, the read data pulse train is not coupled to the input of the pulse-width modulator, which in this particular case is implemented by use of a voltage-controlled one-shot multivibrator ("V.C.O.S.") 136. Instead, the one-shot 136 receives as its primary input the primary (control voltage) output of the PLL (phase-locked loop) circuit 38, appearing on line 39, as the signal which triggers the onset of each pulse from this stage. This is a significant change from the system 34 of FIG. 5, since the primary (tracking) output from PLL 38 is more closely synchronized with the clock output produced by this PLL, and it also corrects for other potential sources of error, e.g. noise, peak shift, etc. in the read data stream. Thus, use of this data-tracking signal to trigger the one-shot 136 will help position the final remodulated output pulse from the system at or near the center of the detection window and help make other improvements as well.

In the system 134 of FIG. 6, the control input 146 of voltage-controlled one-shot 136 receives the filtered and phase-shifted error signal output from the PLL circuit 38, appearing on line 146. In this version of the system, a loop filter 44a first receives the error signal from PLL circuit 38 on line 40, and provides a control voltage on line 48 back to the internal voltage-controlled oscillator 50 of PLL network 38. It is because this control voltage actually represents tape speed rather than pulse position error that the aforementioned phase shift (in the modulating signal applied on line 146 to PWM 136) is so important. The main output from loop filter 44a is thus provided to a band-pass 90° phase-shift filter 44b network analogous to filter 44 and phase-shifter 43 of system 34 discussed above in conjunction with FIG. 5. The output from the voltage-controlled one-shot 136 is connected to an additional pulse generator 42, directly analogous to the output one-shot 42 discussed in conjunction with FIG. 5, which should be understood as producing a standard 200 nanosecond output pulse from the time-varying width-modulating pulse output from the modulator (V.C.O.S.) 136.

Figure 8A:
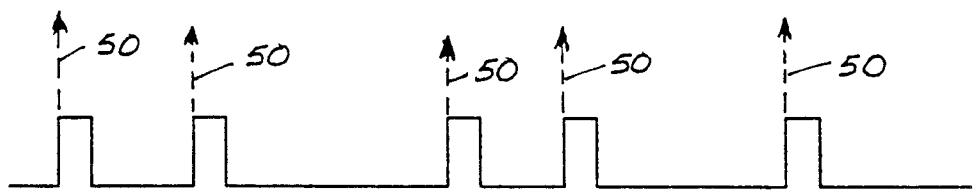
FIG. 8 (consisting of FIGS. 8a, 8b and 8c) is a three-part timing diagram showing data pulses at various points in the system hereof.
Figure 8B:
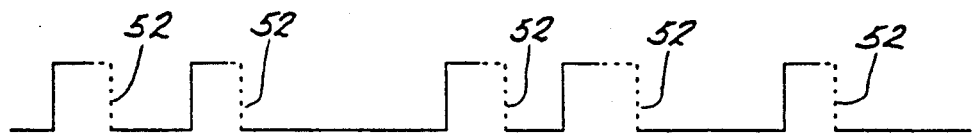

The operation of the system 134 illustrated in FIG. 6 will be more readily apparent following consideration of the timing diagrams depicted in FIG. 8. In that figure, the top line (designated FIG. 8a) shows the read data pulse train appearing on line 16a, i.e. a sequence of pulses generally like those depicted in FIG. 1 and described in conjunction therewith, comprising in essence square-wave MFM pulses having nominally the same spacing but in fact imparted with the time-varying extraneous modulation effects described. Accordingly, the primary output pulse train from PLL 38 appearing on line 39 and applied to the voltage-controlled one-shot 136 is in essence a somewhat corrected form of that appearing on input line 16a.

Figure 8C:

The one-shot pulse-width modulator 136 is triggered on by the leading edge of the pulse train appearing on line 39, as indicated by the arrows 50 in FIG. 8a. Pulse width modulator 136 nominally times out (turns off) after a predetermined interval, for example one microsecond; however, the control voltage input to this component, appearing on line 146, will have the effect of modulating this pulse output by varying its width, i.e. by extending the pulses as a function of the modulation effects present in the input pulse train on line 16a. This effect is illustrated on the second line of FIG. 8, designated FIG. 8b, wherein the dash lines 52 designate the controlled time-out of one-shot 136. The output one-shot 42, which receives the remodulated pulse train from one-shot 136, has a fixed-width time-out (e.g. 200 nanoseconds) but is triggered on by the trailing edge of the remodulated pulse train of FIG. 8b; consequently the ultimate output from system 134 appearing on its output line 54 comprises a series of inversely remodulated uniform-width pulses 56 as illustrated in FIG. 8c, each of which commences at the time-out point of one-shot 136.

Accordingly, the output pulses 56 from system 134 comprise, in effect, the inversely remodulated read data pulse train from tape drive 14, but without the undesirable variations in frequency resulting from ISV effects (in this particular example) or from other analogous causes creating similar spurious effects in a data pulse train. In fact the remodulated pulse train 56 of FIG. 8c is delayed by the effective width of the modulated pulses produced by pulse-width modulator 136, which will be a varying delay directly related to the amount of spurious modulation present; however, pulse train 56 does not exhibit the undesired timing irregularities (modulation effects) and is instead a regularly-occurring MFM pulse train which faithfully portrays the data content in the pulse train outputted from tape drive 14, thereby eliminating the underlying difficulty and resolving the associated problem (in effect, absorbing the timing inaccuracies resulting from ISV effects).

Figure 9:
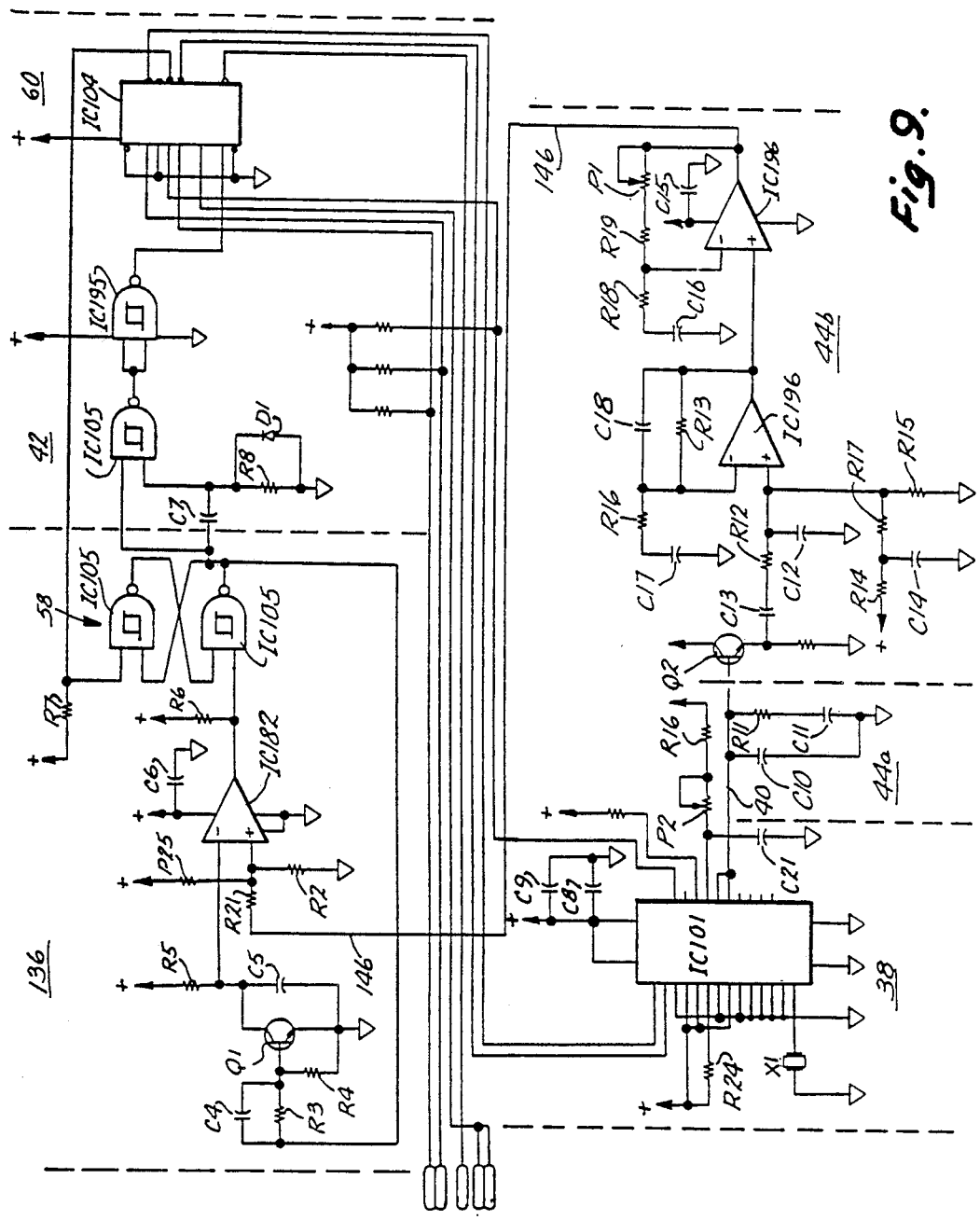
FIG. 9 is a schematic drawing of a circuit corresponding to the system shown in FIG. 7.

Although the system block diagram depicted in FIG. 6 is believed to reasonably enable those skilled in the art to practice the underlying invention, a particular exemplary schematic implementation is depicted in FIG. 9, in which the various functional blocks corresponding to those identified in FIG. 6 are delineated by dash lines and designated by the same basic numerals. Therefore, with reference to FIG. 9, it will be seen that the voltage-controlled one-shot pulse-width modulator 136 comprises in effect a switching transistor Q1 which controls one terminal of an integrated-circuit comparator IC102 (e.g. an LM319IC integrated circuit), whose other input is provided from the output of the band-pass filter and phase shift network 44b, on line 146. The output from comparator IC102 is applied to a flip-flop stage 58 comprising a pair of NAND which may be implemented by a quad NAND IC105. The output from this V.C.O.S. stage is supplied to the output one-shot 42, which may be implemented by a standard one-shot integrated circuit (e.g. a 74H221) or by another quad NAND IC105 in the manner illustrated. A buffer stage 60 may be used at the output of one-shot 42, implemented for example by integrated circuit IC104 (e.g. the commercial integrated circuit designated as 74HCT368). Such a buffer really constitutes part of the disk/tape controller interface, and thus does not require any particular discussion here.

With continuing reference to FIG. 9, the phase-locked loop and the data separator 38 may be implemented by an integrated circuit designated IC101 (for example, the commercial integrated circuit identified by the designation 34D441, which is a well-known data separator/PLL chip). The loop filter 44a may be comprised simply of the parallel timing circuit comprised of resistor R11 and capacitors C11 and C12, as illustrated, which receives the output from PLL network 38 on line 40. As may be appreciated upon reflection, the control voltage shown in FIG. 6 as appearing on a separate line 48 is fed back from pin 15 to pin 16 of IC101, loop filter 44a being connected between line 40 and the system ground. Band pass filter and phase shift network 44b may be implemented in a number of ways, but FIG. 9 shows an implementation which includes an input transistor Q2 connected in emitter-follower configuration and used to supply one input to the first of two cascaded differential amplifiers designated IC106 (which may be the commercial devices known by the designation TL084). Phase shift characteristics are imparted partially by the feedback loop on the second such differential amplifier, comprised of resistors R19 and R20, together with capacitors C17 and potentiometer P1, together with the effects of output series resistor R21 and the capacitor C18 connected between the output and circuit ground.

Figure 7:
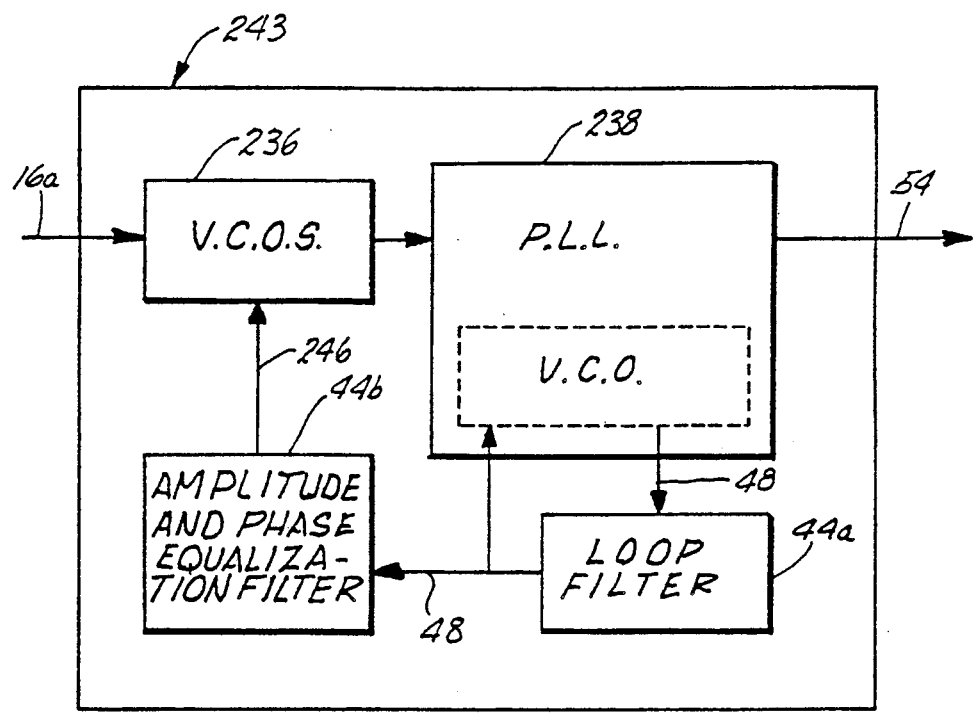
FIG. 7 is a system block diagram showing an alternate implementation of the invention.

FIG. 7 illustrates an alternate implementation of the invention. Unlike system 134, illustrated in FIG. 6, the input to the PLL (238) in this embodiment is from the output of the voltage-controlled one-shot 236 instead of from the read data line 16a, the latter being used as the input to V.C.O.S. 236. The output from the loop filter 44a is fed on line 48 to a filter 44b (labeled "amplitude and phase-equalization filter") which, like filter 44 of the FIG. 6 embodiment, passes the band of frequencies comprising the erroneous modulation content and adjusts the amplitude and phase of the pass band over the range of frequencies for which the system is to be effective in removing the frequency modulation effects in the read data stream. The output of filter 44b, on line 246, is supplied to the control input of the V.C.O.S. 236. Thus, like system 34 of FIG. 5, the data read line 16a is coupled to the V.C.O.S. input; however, the system output 54 is from the PLL.

Accordingly, the FIG. 7 embodiment will be seen to comprise a closed-loop system, incorporating negative feedback, whereas the FIG. 6 embodiment comprises an open-loop system. In the FIG. 7 embodiment, the phase-locked loop (here designated 238) will be able to track the data stream, since a substantial amount of the erroneous modulations in the data stream will have been cancelled out before being applied to the input of PLL 238, due to the feedback signal applied to control input of V.C.O.S. 238 on line 246, from the loop filter 44a and the band pass filter and phase shift network 44b. Thus, the output from PLL 238 may be used as the system output on line 54, and there is no need for an additional output pulse generator like that shown at 42 in the FIG. 6 embodiment.

As may be appreciated, there are certain advantages in using a closed-loop system such as that illustrated in FIG. 7. For example, it is potentially operable over a broader band than the FIG. 6 embodiment and it is self-equalizing in nature, not being subject to performance variation caused by such things as degradation in component operation with time and temperature. Also, a selected degree of corrective remodulation may be established by choosing a particular gain for the circuit (i.e. amount of negative feedback used), and that same amount of correction will automatically be maintained over time regardless of other system or operational changes. To be sure, it is unlikely that the FIG. 7 embodiment would be used to completely eliminate the erroneous data stream modulations, but that is not strictly necessary in order to provide good overall system operation, and the advantages provided by this implementation are believed to substantially outweigh any perceived disadvantage. Of course, the FIG. 6 implementation also provides substantial improvement over prevalent conditions, and in fact may be set up initially to provide near-complete elimination of the undesirable modulation effects causing the problem. Being open-loop in nature, however, that system will not automatically vary its operation as a result of system or operation changes.

Of course, it is understood that the above descriptions are those of preferred embodiments of the invention. Various other embodiments as well as many changes and alterations may be made without departing from the spirit and broader aspects of the invention as defined in the claims.

The embodiments of the invention in which an exclusive property or privilege is claimed are defined as follows:

1. In a digital computer system of the type having a digital computer and at least one data storage device coupled to said computer for storing and transferring streams of digital data therebetween, wherein such transfer of data between computer and storage device causes alterations in the relative timing of data bits in said streams, the improvement for correcting such relative timing changes comprising:

modulation means connected in the data stream between said data storage device and said computer, said modulation means having an input coupled to receive signals representative of said storage device output and having an output operatively coupled to said computer to provide a data signal to said computer having substantially the same signal format as the signal received at said input of said modulation means;

said modulation means including means for producing an error signal which is representative of said alterations in bit timing in the data stream output from said storage device, and further including means for modulating said data stream between the said input and output of the modulation means in accordance with said error signal in a manner which changes the altered bit timing of the data before it is coupled to said computer by reducing the extent of said caused alternations, whereby the bit timing in the data stream received by said computer from said storage device is changed from that provided by the storage device for sending to the computer.

2. The improvement according to claim 1, wherein said means for modulating said data stream comprises frequency-modulation means.

3. In a digital computer system of the type having a digital computer and at least one data storage device coupled to said computer for storing and transferring streams of digital data therebetween, wherein such transfer of data between computer and storage device causes alterations in the relative timing of data bits in said streams, the improvement for correcting such relative timing changes comprising:

modulation means connected in the data stream between said data storage device and said computer, said modulation means having an input coupled to receive signals representative of said storage device output and having an output operatively coupled to said computer;

said modulation means including means for producing an error signal which is representative of said alterations in bit timing in the data stream output from said storage device, and further including means for modulating said data stream between the said input and output of the modulation means in accordance with said error signal in a manner which changes the altered bit timing of the data before it is coupled to said computer by reducing the extent of said caused alternations, whereby the bit timing in the data stream received by said computer from said storage device is changed from that provided by the storage device for sending to the computer; and wherein said means for modulating comprises a pulse-width modulator.

4. The improvement according to claim 3, wherein said modulator comprises a variable one-shot device.

5. The improvement according to claim 3, wherein said means for producing an error signal comprises a phase-locked loop circuit.

6. The improvement according to claim 5, wherein said error signal comprises the error signal output of said phase-locked loop circuit.

7. The improvement according to claim 6, wherein said pulse-width modulator has an input coupled to the output of said storage device.

8. The improvement according to claim 6, wherein said phase-locked loop circuit has a primary output which is directly representative of the bit timing in the data stream outputted by said storage device, and wherein said pulse-width modulator has an input coupled to receive said phase-locked loop primary output.

9. The improvement according to claim 8, wherein said modulator comprises a variable one-shot device.

10. The improvement according to claim 8, and further including an output device for said modulation means comprising a bit generator coupled to receive the output from said pulse-width modulator and adapted to produce an output pulse of substantially uniform width in synchronism with output pulses from said pulse-width modulator.

11. The improvement according to claim 10, wherein said output device bit generator is adapted to produce said output pulse in synchronism with the trailing edge of the output from said pulse-width modulator.

12. The improvement according to claim 7, wherein said pulse-width modulator has an output which is coupled to the input of said phase-locked loop circuit, and wherein the output of said phase-locked loop circuit comprises the output of said modulation means.

13. The improvement according to claim 6, and further including means coupled between said phase-locked loop circuit and said pulse-width modulator for phase-shifting said error signal output.

14. The improvement according to claim 6, and further including means coupled between said phase-locked loop circuit and said pulse-width modulator for limiting the frequency of said error signal output coupled to said pulse-width modulator.

15. The improvement according to claim 14, and further including means coupled between said phase-locked loop circuit and said pulse-width modulator for phase-shifting said error signal output.

16. The improvement according to claim 14, wherein said peripheral data-storage device comprises a tape drive utilizing recordable tape storage media, and said alterations in relative timing of data bits are caused at least in part by speed variations which are generally attributable to said tape drive and tape.

17. A method of correcting data timing in digital data communication systems of the type wherein streams of data in pulse form are communicated between different component devices in such system and the desired timing of such pulses is changed during such communication, said method comprising the steps of:

using the pulses in a data stream having changed pulse timing to produce a control signal which is representative of the changes in timing undergone by said pulses; and remodulating said data stream to further change the timing of said pulses having changed timing by using said control signal to controls such remodulation, in a manner such that the extent of said further changes in timing generally corresponds to the differences between said changed pulse timing and the said desired timing, whereby the remodulated data stream substantially embodies timing corresponding to said desired timing, wherein said remodulated data stream is for communication to one of the different component devices and comprises pulses having substantially equal pulse widths and having a non-zero time duration between pulses.

18. The method according to claim 17, wherein said control signal comprises a timing signal which is inversely representative of the said changes in timing undergone by said pulses.

19. A method of correcting data timing in digital data communication systems of the type wherein streams of data in pulse form are communicated between different component devices in such system and the desired timing of such pulses is changed during such communication, said method comprising the steps of:
using the pulses in a data stream having changed pulse timing to produce a control signal which is representative of the changes in timing undergone by said pulses; and
remodulating said data stream to further change the timing of said pulses having changed timing by using said control signal to control such remodulation, in a manner such that the extent of said further changes in timing generally corresponds to the differences between said changed pulse timing and the said desired timing, whereby the remodulated data stream substantially embodies timing corresponding to said desired timing;
wherein said step of remodulating comprises producing a modified pulse train having substantially the same number of pulses per unit time as said stream of data with desired timing but in which the corresponding pulses are of different duration than those in said stream of data, such differences in pulse duration generally corresponding to said changes in desired timing undergone during said communication.

20. The method according to claim 19, further including the step of using said modified pulse train to produce an output pulse train comprised of pulses having generally uniform width but embodying pulse spacing which is at least partially representative of said duration differences in said modified pulse train.

21. The method according to claim 19, wherein said control signal comprises a pulse train, and further including the step of phase-shifting said control signal pulse train prior to using it during said remodulation 22. The method according to claim 19, including the step of restricting the frequency of said control signal to a predetermined range prior to using it during said remodulation.

23. The method according to claim 22, wherein said control signal comprises a pulse train, and further including the step of phase-shifting said control signal pulse train prior to using it during said remodulation.

24. The method according to claim 23, further including the step of using said modified pulse train to produce an output pulse train comprised of pulses having generally uniform width but embodying pulse spacing which is at least partially representative of said duration differences in said modified pulse train.

25. A method of correcting tape drive speed-variation effects on digital data streams in data systems of the type having a data-storage tape drive coupled to other data-processing components for communication of digital data streams therebetween, comprising the steps of:
treating said speed-variation effects as undesired frequency modulations of the digital data in such data streams and correcting for such undesired modulations by remodulating the frequency of said data streams by detecting and utilizing the changes actually introduced by such speed-variation effects, thereby reducing the presence of such undesired modulations in the resulting remodulated data stream;
whereby said resulting remodulated data stream comprises data pulses having substantially equal pulse widths with a non-zero time duration between pulses.

26. The method according to claim 25, wherein said remodulating is carried out at least in part by changing the effective pulse width of pulses in a stream which generally correspond to those in the data stream having speed-variation effects, such changes in pulse width generally corresponding to the frequency-modulation effects caused by said speed variations.

27. Means for correcting data stream bit-timing changes caused by variations in the transport speed of the recording medium in a movable-medium data storage device comprising:
means operatively coupled to said storage device for receiving representations of a data stream outputted thereby embodying such timing changes, said means having an output comprising an error signal which is inversely proportional to said bit-timing changes, said means including a band-pass filter, the pass band of which includes the frequency of said timing variations;
means controlled by said error signal output for producing a modified data stream generally corresponding to and parallel with the data stream having such bit-timing changes but having further timing changes corresponding inversely to said changes caused by recording medium speed variations; and
means for receiving said modified data stream and utilizing same to produce a corrected data stream in which said bit-timing changes are substantially eliminated.

28. Means as defined in claim 27, wherein said means operatively coupled to said storage device comprises a phase-locked loop, and said output of such means comprises the error-signal output of such phase-locked loop.

29. Means for correcting data stream bit-timing changes caused by variations in the transport speed of the recording medium in a movable-medium data storage device comprising:
means operatively coupled to said storage device for receiving representations of a data stream outputted thereby embodying such timing changes, said means having an output comprising an error signal which is inversely proportional to said bit-timing changes;
means controlled by said error signal output for producing a modified data stream generally corresponding to and parallel with the data stream having such bit-timing changes but having further timing changes corresponding inversely to said changes caused by recording medium speed variations; and means for receiving said modified data stream and utilizing same to produce a corrected data stream in which said bit-timing changes are substantially eliminated;

wherein said means operatively coupled to said storage device comprises a phase-locked loop, and said output of such means comprises the error-signal output of such phase-locked loop; and wherein said means controlled by said error signal output comprises a variable pulse-width modulator.

30. Means as defined in claim 29, further including a frequency-selective filter coupled between said phase-locked loop error output and said pulse-width modulator.

31. Means as defined in claim 29, further including phase-shifting means coupled between said phase-locked loop error output and said pulse-width modulator.

32. Means as defined in claim 31, wherein said phase-shifting means provides on the order of ninety degrees of phase shift in said error signal.

33. Means as defined in claim 27, wherein said means operatively coupled to said storage device comprises a pulse-width modulator, and further including a phase-locked loop having an input coupled to receive the output from said pulse-width modulator, said phase-locked loop having a primary output providing said corrected data stream and having an error signal output coupled back to the control input of said pulse-width modulator to form a closed-loop system.

34. In a digital computer system of the type having a digital computer and at least one data storage device coupled to said computer for storing and transferring streams of digital data therebetween, wherein such transfer of data between computer and storage device causes alterations in the relative timing of data bits in said streams, the improvement for correcting such relative timing changes comprising:

modulation means connected in the data stream between said data storage device and said computer, said modulation means having an input coupled to receive signals representative of said storage device output and having an output operatively coupled to said computer;

said modulation means including means for producing an error signal which is representative of said alterations in bit timing in the data stream output from said storage device, and further including means for modulating said data stream between the said input and output of the modulation means in accordance with said error signal in a manner which changes the altered bit timing of the data before it is coupled to said computer by reducing the extent of said caused alterations, whereby the bit timing in the data stream received by said computer from said storage device is changed from that provided by the storage device for sending to the computer; and wherein said output of said modulation means is coupled to a data separator providing a clock signal and a data signal for further processing in said computer.

35. A method of correcting tape drive speed-variation effects on digital data streams in data systems of the type having a data-storage tape drive coupled to other data-processing components for communication of digital data streams therebetween, comprising the steps of:

treating said speed-variation effects as undesired frequency modulations of the digital data in such data streams and correcting for such undesired modulations by remodulating the frequency of said data streams by detecting and utilizing the changes actually introduced by such speed-variation effects, thereby reducing the presence of such undesired modulation in the resulting remodulated data stream; and said method including the step of band-pass filtering the detected variations to pass signals having the frequency of said undesired modulations for controlling said remodulating.

* * * * *